INVENTORS
Roger M. MILLER
Bruno MUELLER
Walter G. SOROCHAN

AGENT

United States Patent Office 3,446,884
Patented May 27, 1969

3,446,884
EXTRUSION PROCESS AND APPARATUS FOR PRODUCING A THERMOPLASTIC PIPE HAVING A GLOSSY SURFACE
Roger M. Miller, Toronto, Ontario, Bruno Mueller, Bramalea, Ontario, and Walter G. Sorochan, Port Credit, Ontario, Canada, assignors to Canadian Industries Limited, Montreal, Quebec, Canada, a corporation of Canada
Filed Mar. 8, 1967, Ser. No. 621,570
Claims priority, application Canada, Apr. 22, 1966, 958,680
Int. Cl. B29d 23/04
U.S. Cl. 264—209                               6 Claims

ABSTRACT OF THE DISCLOSURE

Thermoplastic material is extruded through an annular die provided with polytetrafluoroethylene rings at its exit end, whereby pipe having a glossy surface is obtained. The polytetrafluoroethylene rings permit the production of high quality pipe at high extrusion rate from thermoplastic materials which generally give a mat surface when extruded through a standard die.

---

Figure 1:
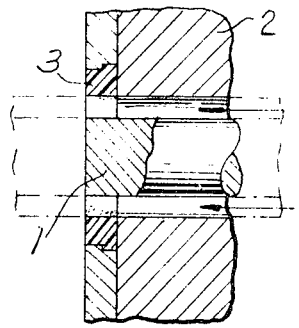

This invention relates to the extrusion of organic thermoplastic materials and, more particularly, to a process and apparatus for the extrusion of such materials into pipes having a glossy surface.

In the production of pipes from organic thermoplastic materials, such as polyethylene, in the molten state by an extrusion process, it is the normal practice to extrude the molten material through an annular steel die the inside diameter of which corresponds approximately to the outside diameter of the desired pipe, the said die being provided with an internal circular steel mandrel the diameter of which corresponds approximately to the inside diameter of the desired pipe, and by means of air, another gaseous fluid or a cooled external mandrel to prevent the extruded thermoplastic pipe from collapsing after it has left the die but before it has cooled into the set condition. Depending upon the surface finish desired, i.e. external polishing only or both external and internal polishings, the pipe-forming apparatus used is of the sizing plate or box type or of the extended mandrel type.

Under normal extrusion conditions, the friction between the steel die and the thermoplastic extrudate causes some surface distortion of the latter with the result that the extruded plastic pipe presents a mat surface, the degree of matness being governed by the extent of the surface distortion. With some thermoplastic materials, this problem could largely be overcome by the use of very high polymer temperatures and/or very high die temperatures but only at the expense of considerably slower extrusion rates which are uneconomical on a commercial scale. Furthermore, too hot an extruded polymer can cause problems in pipe sizing devices and unless the pipe is cooled to a certain level prior to coiling, it will assume an elliptical profile.

It is an object of the present invention to provide a process and apparatus whereby organic thermoplastic materials can be consistently extruded at relatively low stock temperatures into pipes having a glossy surface without any of the afore-mentioned problems being encountered. Additional objects of the invention will appear hereinafter.

In accordance with the present invention, an organic thermoplastic material is extruded in the molten state through an annular metallic die provided with an internal circular metallic mandrel, and is brought into contact with a polytetrafluoroethylene ring located at the exit end of the die, said ring having an internal diameter slightly smaller than the internal diameter of said die and projecting beyond the extremity of said mandrel in the direction of flow of said thermoplastic material.

The pipe-forming apparatus of the invention comprises an annular metallic die, an internal circular metallic mandrel and a polytetrafluoroethylene (P.T.F.E.) ring of a diameter slightly smaller than the diameter of the die attached to the exit end of said die, said ring projecting beyond the extremity of said mandrel.

When using an extended mandrel type extrusion die system to obtain a pipe having a glossy surface both internally and externally, the mandrel of the above defined apparatus is provided with a tapering extension on which is secured a P.T.F.E. ring or insert of an external diameter slightly greater than the diameter of the mandrel, said ring being coaxial and coextensive with the ring attached to the annular die.

The result obtained with the process and apparatus of the present invention, i.e. the consistent production of glossy plastic pipes, is surprising and unexpected.

Figure 2:
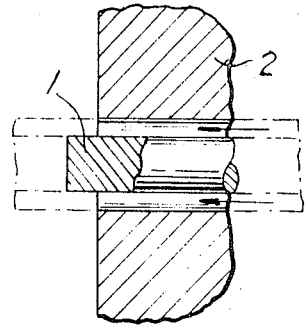
Figure 3:
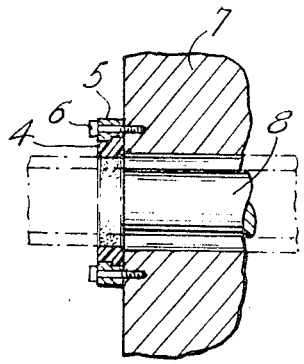
Figure 4:
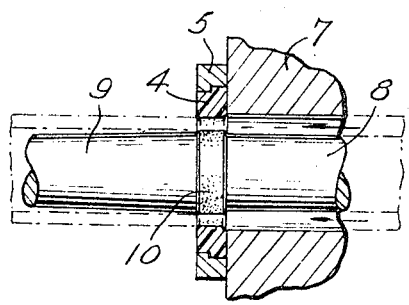

The invention will be more fully illustrated by reference to the accompanying drawings in which:

FIGURES 1 and 2 are schematic cross-sectional views of pipe-forming apparatus which give mat surfaces;

FIGURE 3 is a schematic cross-sectional view of an apparatus constituting one embodiment of the invention and illustrates the terminal part of a sizing plate or box type pipe-forming apparatus of standard construction, with a P.T.F.E. ring attached thereto; and FIGURE 4 is a similar view of an apparatus constituting another embodiment of the invention and illustrates the terminal part of an extended mandrel type pipe-forming apparatus of standard construction having two P.T.F.E. sizing rings attached thereto.

In both FIGURES 1 and 2, part 1 is a steel mandrel and part 2 is an annular steel die. In FIGURE 1, a P.T.F.E. ring 3 is shown attached to the end of the die 2, said ring having the effect of equalizing the length of said die to that of the mandrel 1. The arrangement of FIGURE 2 is exactly same as that of FIGURE 1 but is devoid of P.T.F.E. ring. FIGURES 1 and 2 show pipe-forming dies of conventional construction and are provided to illustrate pipe-forming apparatus which, even when combined with a P.T.F.E. ring, give pipes with a mat finish.

With many pipe compounds, it is necessary to reach quite high stock temperatures to obtain pipes with an acceptable glossy surface when using pipe forming apparatus of standard construction, i.e. the extrusion die systems of FIGURES 3 and 4 without the P.T.F.E. rings. There are, however, factors which prevent the use of too high temperatures. A melt which is too hot usually causes problems in the sizing device and, unless the pipe is cooled to a certain level prior to coiling, it will assume an elliptical profile. Under high temperature production conditions, maintaining a circular cross-section can generally be accomplished only by reducing output rate, or by increasing the cooling stage length.

The pipe-forming system of the present invention, as illustrated in FIGURES 3 and 4, obviates the disadvantages inherent to the standard apparatus and to the apparatus illustrated in FIGURES 1 and 2 by making it possible to obtain a highly glossy surface while operating at relatively low extrusion temperatures.

FIGURE 3 illustrates the present invention and shows a P.T.F.E. ring or insert 4 attached by means of a retaining ring 5 and screws 6 to the exit end of a die 7 which is coaxial and coextensive with a mandrel 8. Parts 7 and 8 are, in fact, the die and mandrel of a sizing plate or box type pipe extruder of standard construction. As clearly shown in the drawing, the ring 4 is smaller in diameter than the die.

FIGURE 4 shows the same basic structure as FIGURE 3 except that the mandrel 8 is provided with a tapering extension 9, such extension having secured thereon a polytetrafluoroethylene ring 10. The ring is so located on the extension that it is coaxial and coextensive with ring 4 attached to the die 7. In addition the ring 10 has a diameter slightly greater than the diameter of the mandrel 8. FIGURE 4 without parts 4, 5 and 10, i.e. without the P.T.F.E. rings represents an extended mandrel type pipe-forming apparatus of standard construction.

Generally, parts 7, 8 and 9 of the system of FIGURES 3 and 4 are made of steel and are of quite conventional construction except for the slight modification necessary for fixation of the P.T.F.E. rings 4 and 10.

The location of ring 4 relative to the die end is somewhat critical in that it should not be located more than 0.020 or 0.030 inch away from said die end. It is also important that the die insert 4 be so placed as to lead the end of the mandrel 8. In order to maintain contact with the extrudate, the P.T.F.E. insert 4 must be made approximately 0.030 inch smaller in internal diameter than the die itself. In the case of the construction illustrated in FIGURE 4, the ring 10 should also be 0.030 inch larger in external diameter than the mandrel. It is also preferable, although not critical, to radius the front and rear edges of inserts 4 and 10 to streamline the flow of extrudate and to protect the mid area against damage from sharp, hard cleaning instruments.

The land length of the insert 4 is not really critical and its determination is a function only of the structural strength of the P.T.F.E. constituting said insert. Properly held, a 1/16-inch long insert would impart a good polish. On a 1-inch pipe die for instance, it has been found that a 1/4-inch long insert with but a 1/32-inch step around the diameter for the retaining ring, was most practical.

When the pipe-forming apparatus of FIG. 3 is in operating condition, the molten thermoplastic material flows therethrough in the direction indicated by the arrow between the die 7 and the mandrel 8. At one point the molten material comes into contact with the P.T.F.E. ring 4 and leaves such ring 4 after it has lost contact with the mandrel 8. The product obtained in the above operation is a pipe having a very glossy outside surface.

With the embodiment of the invention illustrated in FIG. 4, the operation is the same as with the arrangement of FIG. 3, except that the molten material comes into contact with two P.T.F.E. rings, namely 4 and 10, which together form a venturi and exert a polishing action on both external and internal surfaces of the formed pipe.

Using the apparatus shown in FIG. 3, a low density polyethylene resin, maintained at about 280° F., was extruded into a one-inch diameter pipe having a very glossy surface at an output rate of about 100 pounds of resin per hour. Extrusion of the same low density polyethylene resin, through an all metal system of standard construction such as the apparatus of FIGURE 2 without parts 4, 5 and 6 at a high melt temperature of 315° F. produced a surface which was just acceptable.

Extruding an intermediate density polyethylene compound with the pipe-forming system illustrated in FIGURE 4, a one-inch diameter pipe with a high gloss was made at output rates which ranged from 110 to 160 pounds of resin per hour. No deterioration of surface finish was observed when extruding at temperatures as low as 370° F. Using systems of standard construction temperatures in the range of 415 to 425° F. would be required for the same compound in order to obtain an acceptable surface finish. The surface finish in this case would still be inferior to that obtained with the pipe-forming system of the invention.

Although exemplified in association with polyethylene only, the process of this invention is applicable to the extrusion of all thermoplastic materials suitable for pipe manufacture, e.g. polypropylene, polyvinyl chloride, butadiene-styrene-acrylonitrile polymers, etc.

What we claim is:

1. A process for the production of a thermoplastic pipe having a glossy surface which comprises extruding a molten thermoplastic material through an annular metallic die provided with an internal circular metallic mandrel and bringing said thermoplastic material into contact with a polytetrafluoroethylene ring located not more than about 0.03 inch away from the exit end of said die, said ring having an internal diameter about 0.03 inch smaller than the internal diameter of said die and projecting beyond the extremity of said mandrel in the direction of flow of said thermoplastic material.

2. A process as claimed in claim 1 wherein the molten thermoplastic material, while brought into contact with the ring located at the exit end of the die, is simultaneously brought into contact with a second polytetrafluoroethylene ring located on a tapering extension affixed to the mandrel, said second ring having an external diameter about 0.03 inch greater than the diameter of said mandrel and being coaxial and coextensive with the ring attached to the die.

3. A pipe-forming apparatus for the production of thermoplastic pipe having a glossy surface which comprises, in combination, an annular metallic die, an internal circular metallic mandrel and a polytetrafluoroethylene ring located not more than about 0.03 inch away from the exit end of said die, said ring having an internal diameter about 0.03 inch smaller than the internal diameter of said die and projecting beyond the extremity of said mandrel.

4. A pipe-forming apparatus as claimed in claim 3 comprising, in addition, a second polytetrafluoroethylene ring located on a tapering extension affixed to the mandrel, said second ring having an external diameter about 0.03 inch greater than the diameter of said mandrel and being coaxial and coextensive with the ring attached to the die.

5. A pipe-forming system as claimed in claim 3 wherein the ring has a land length of about 0.25 inch.

6. A pipe-forming system as claimed in claim 4 wherein both rings have a land length of about 0.25 inch.

References Cited

UNITED STATES PATENTS

| | | |
|---|---|---|
| 2,403,476 | 7/1946 | Berry. |
| 2,491,588 | 12/1949 | Shively. |
| 2,736,057 | 2/1956 | Davis. |
| 2,814,071 | 11/1957 | Allan _____ 264—209 |
| 3,008,434 | 11/1961 | Maldaril. |
| 3,134,832 | 5/1964 | Smith. |
| 3,170,972 | 2/1965 | Knipp _____ 264—169 X |

ROBERT F. WHITE, Primary Examiner.

ALLEN M. SOKAL, Assistant Examiner.

U.S. Cl. X.R.

18—14, 47; 264—338